(12) United States Patent
Hambar et al.

(10) Patent No.: US 11,871,695 B2
(45) Date of Patent: Jan. 16, 2024

(54) HEIGHT OF CUT ADJUSTMENT SYSTEM

(71) Applicant: Deere & Company, Moline, IL (US)

(72) Inventors: Priyanka Hambar, Pune (IN); Sanjeev M. Hallale, Pune (IN)

(73) Assignee: DEERE & COMPANY, Moline, IL (US)

( * ) Notice: Subject to any disclaimer, the term of this patent is extended or adjusted under 35 U.S.C. 154(b) by 378 days.

(21) Appl. No.: 17/301,110

(22) Filed: Mar. 25, 2021

(65) Prior Publication Data

US 2022/0304225 A1 Sep. 29, 2022

(51) Int. Cl.
*A01D 34/74* (2006.01)
*A01D 34/66* (2006.01)

(52) U.S. Cl.
CPC ........... *A01D 34/74* (2013.01); *A01D 34/661* (2013.01)

(58) Field of Classification Search
CPC ............................... A01D 34/74; A01D 34/661
See application file for complete search history.

(56) References Cited

U.S. PATENT DOCUMENTS

| | | | |
|---|---|---|---|
| 3,511,033 A | 5/1970 | Strasel | |
| 4,854,112 A | 8/1989 | Holley et al. | |
| 5,606,851 A * | 3/1997 | Bruener | A01D 34/74 56/10.8 |
| 5,797,252 A * | 8/1998 | Goman | A01D 34/74 56/DIG. 14 |
| 7,395,648 B1 | 7/2008 | Silbernagel et al. | |
| 7,716,907 B2 * | 5/2010 | Joliff | A01D 34/74 56/17.1 |
| 7,793,487 B1 | 9/2010 | Schnell et al. | |
| 8,371,095 B2 | 2/2013 | Grewe et al. | |
| 9,301,444 B2 | 4/2016 | Campbell et al. | |
| 11,206,759 B2 * | 12/2021 | Gust | A01D 34/74 |
| 11,622,501 B2 * | 4/2023 | Steiner | A01D 34/662 56/17.1 |
| 2019/0124836 A1 | 5/2019 | Aposhian et al. | |
| 2019/0150359 A1 * | 5/2019 | Gust | A01D 34/863 |
| 2019/0183043 A1 * | 6/2019 | Lapp | A01D 34/74 |
| 2019/0289783 A1 * | 9/2019 | Welz | A01D 34/661 |
| 2022/0201933 A1 * | 6/2022 | Fredenburg | A01D 34/661 |
| 2022/0338413 A1 * | 10/2022 | Karsten | A01D 34/74 |

FOREIGN PATENT DOCUMENTS

EP 3476195 A1 5/2019

* cited by examiner

*Primary Examiner* — Abigail A Risic

(57) ABSTRACT

A height of cut adjustment system for a rough, trim and surround mower deck includes a first height of cut linkage on a left side of the mower deck and a second height of cut linkage on a right side of the mower deck. A connecting rod extends transversely across a top of each mower deck to connect the pair of height of cut linkages together. A height of cut adjustment lever may be secured to the connecting rod. The height of cut adjustment lever may have teeth that engage notches in a pivot plate at each selected height of cut.

12 Claims, 4 Drawing Sheets

HEIGHT OF CUT ADJUSTMENT SYSTEM

FIELD OF THE INVENTION

The present invention relates to grass mowing machines for golf courses and more specifically to a height of cut adjustment system for rough, trim and surround mowers.

BACKGROUND OF THE INVENTION

Many new and existing golf courses have narrowed their fairways and expanded their rough areas on either side of the fairways. Roughs require less care than fairways, so narrowing the fairways allows golf course operators to lower their maintenance costs. For example, irrigation requirements may be reduced if only the fairways are watered. If grasses in the roughs are allowed to grow longer, those non-irrigated areas are less brown. Trees and other aesthetic features may be located in the roughs, because roots and shade can inhibit turf growth in the fairways.

However, golf course roughs still must be maintained regularly using grass mowing machines that can mow the vegetation at an acceptable length and appearance. Equipment for mowing golf course roughs typically includes a traction vehicle carrying three or more rotary cutting decks, each rotary cutting deck mounted on the end of a lift arm extending from the traction vehicle. Carrying the rotary cutting decks with lift arms extending from the front or sides of the traction vehicle is necessary and desirable, instead of towing the rotary cutting decks behind the vehicle, because it is necessary for the mower to provide close trims next to trees, bunkers or other hazards. Each lift arm also may be used to move a rotary cutting deck between a mowing position and a transport position. The mounting devices also should allow for pitch (front to back pivoting) and yaw (side-to-side pivoting) of the rotary cutting decks. Additionally, mounting devices should allow adjustment of the front to back angle of a rotary cutting deck for the desired rake or pitch.

Traction vehicles carrying several rotary cutting decks may travel at speeds of 6 to 8 miles per hour when mowing golf course roughs. The traction vehicle's weight may be in excess of 2000 pounds. Each rotary cutting deck may be subject to shocks from impacts against the ground surface or objects during mowing. To withstand the rigorous mowing conditions, rotary cutting decks typically are made of thick sheet steel, such as 7 gage or 10 gage sheet steel. Each rotary cutting deck may have a diameter between about 18 inches and 27 inches, weigh at least 120 pounds, and may have a cutting blade rotated by a hydraulic or electric motor.

Golf course operators sometimes need to change the height of cut of rotary cutting decks on a rough, trim and surround mower. For example, the height of cut may need to be changed if the mower goes from an intermediate rough with a 1½ to 2 inch height of cut, to a full length rough with a 3 to 4 inch height of cut. The height of cut also may need to be changed if the machine is used to mow rough for tournaments where rough heights can be as long as 6 inches. Additionally, golf course operators may change the height of cut of rough, trim and surround mowers due to seasonal variations, shade conditions, or different types of grass or vegetation in different rough areas of a golf course.

Rough, trim and surround mowers may include side plates having a vertically-spaced series of holes, and bolts extending through the holes to secure the deck to the side plates. The deck height may be adjusted by changing the holes in the deck plates and/or the holes in the side plates through which the bolts extend. Other adjustment mechanisms include spacers that may be stacked on several pins that support the deck on a frame, or on casters that are mounted in vertically oriented sleeves. Changing height of cut using the holes or spacers at each of four adjustment points can be cumbersome and time consuming.

U.S. Pat. No. 7,716,907 assigned to Deere & Company of Moline, Illinois relates to a rotary deck height of cut adjustment mechanism for a rough, trim and surround mower that includes a front pair and a rear pair of height of cut arms, and an axle extending between each pair. Each of the four height of cut arms may be pivoted to support the mower deck at different cutting heights, and each has a notch lock that may be moved between a locked position and an unlocked position at each cutting height and rake angle. A lever may be used to push each notch lock from an unlocked position to a locked position or pull the notch lock from a locked position to an unlocked position.

U.S. Pat. No. 9,301,444 assigned to Deere & Company relates to a rotary deck height of cut adjustment mechanism for a rough, trim and surround mower with front and rear height of cut arms supporting a rotary cutting deck, and at least one height of cut adjustment screw that may be rotated to simultaneously change the angle of the height of cut arms. This height of cut adjustment mechanism is faster and more efficient to adjust cutting heights, reduces maintenance and is low in cost.

A height of cut adjustment system is needed for rough, trim and surround mowers that provides the advantages of fast adjustment for rotary decks. A height of cut adjustment system is needed that may be used with many existing rotary cutting decks on rough, trim and surround mowers.

SUMMARY OF THE INVENTION

A height of cut adjustment system includes a left height of cut linkage extending between a front height of cut arm and a rear height of cut arm pivotably mounted to a frame member on the left side of a rotary cutting deck, and a right height of cut linkage extending between a front height of cut arm and a rear height of cut arm pivotably mounted to a frame member on the right side of a rotary cutting deck. Each height of cut linkage including a center link pivotably connected between a front link and a back link. A connecting rod extends between the center link of the left height of cut linkage and the center link of the right height of cut linkage.

DESCRIPTION OF THE PREFERRED EMBODIMENT

Figure 1:
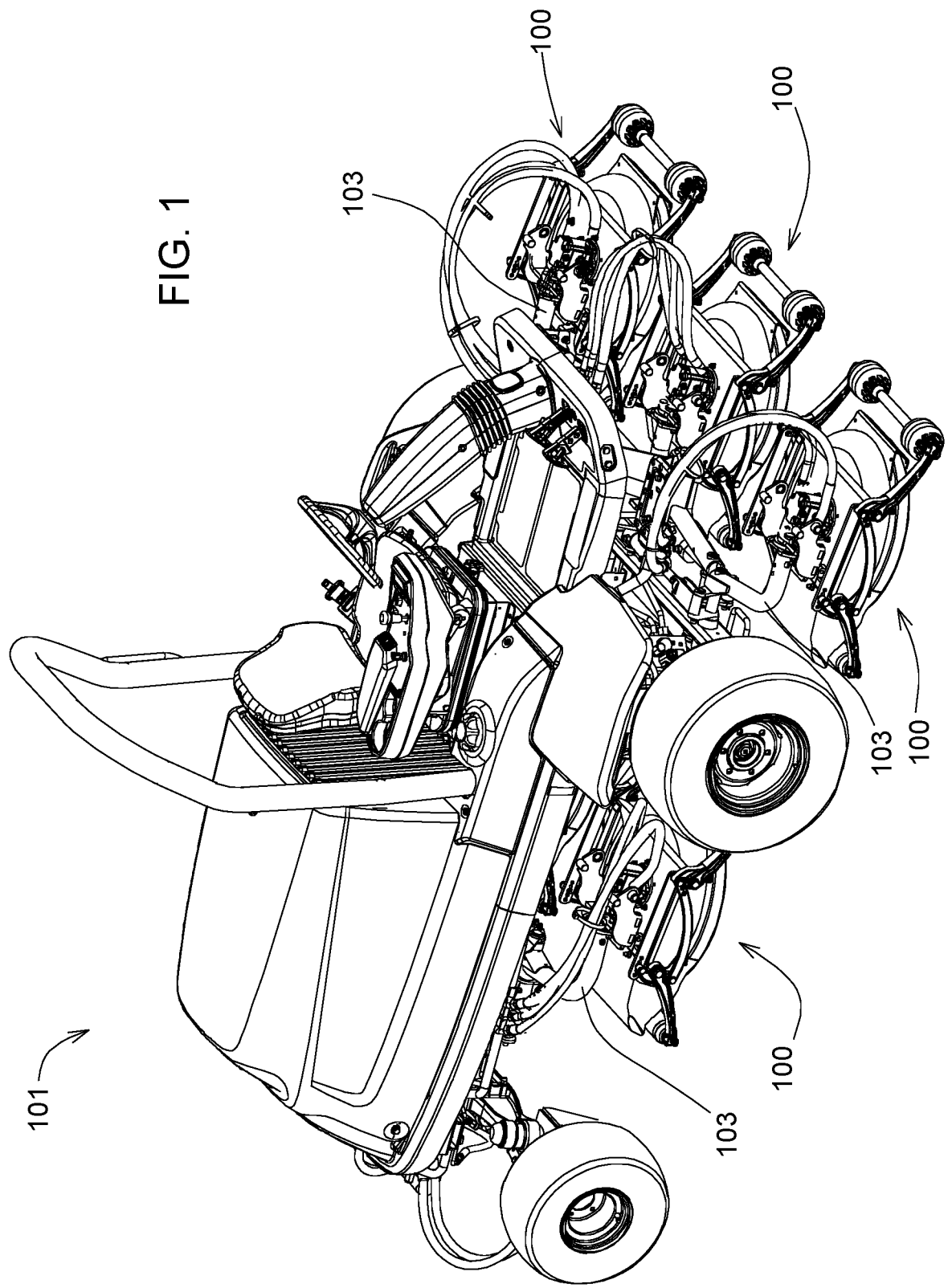
FIG. 1 is a perspective view of a traction vehicle having several rotary decks mounted on lift arms extending from the vehicle, each with a height of cut adjustment system according to a preferred embodiment of the invention.

In one embodiment, as shown in FIG. 1, a plurality of rotary cutting decks 100 may be mounted to traction vehicle 101. Each rotary cutting deck 100 may be pivotably supported at the end of a lift arm 103 which the operator may actuate with one or more hydraulic cylinders or electric lift mechanisms to raise or lower the rotary cutting decks between mowing positions and transport positions.

Figure 2:
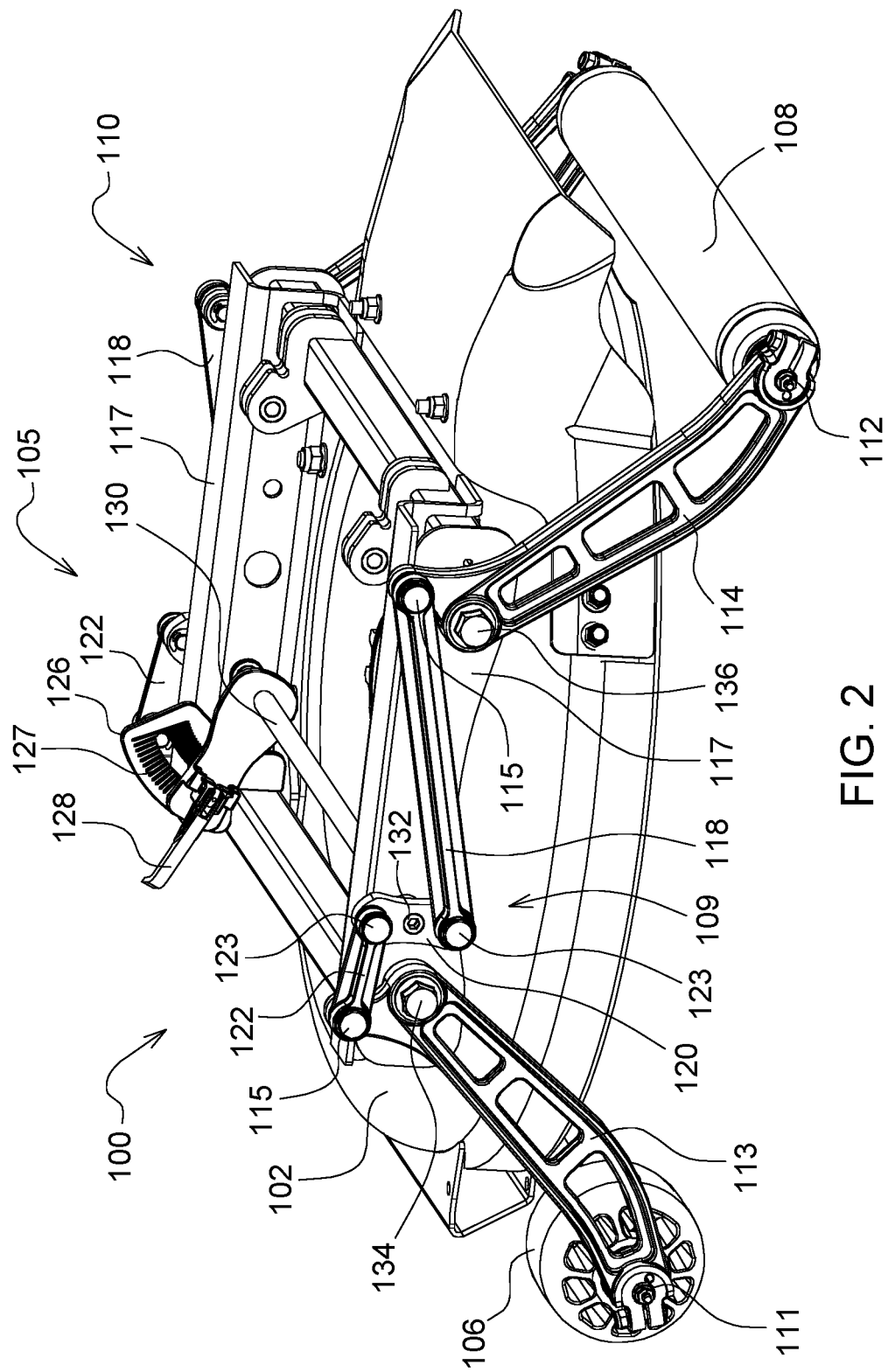
FIG. 2 is a perspective view of a height of cut adjustment system at a first height of cut according to a first embodiment of the invention.
Figure 3:
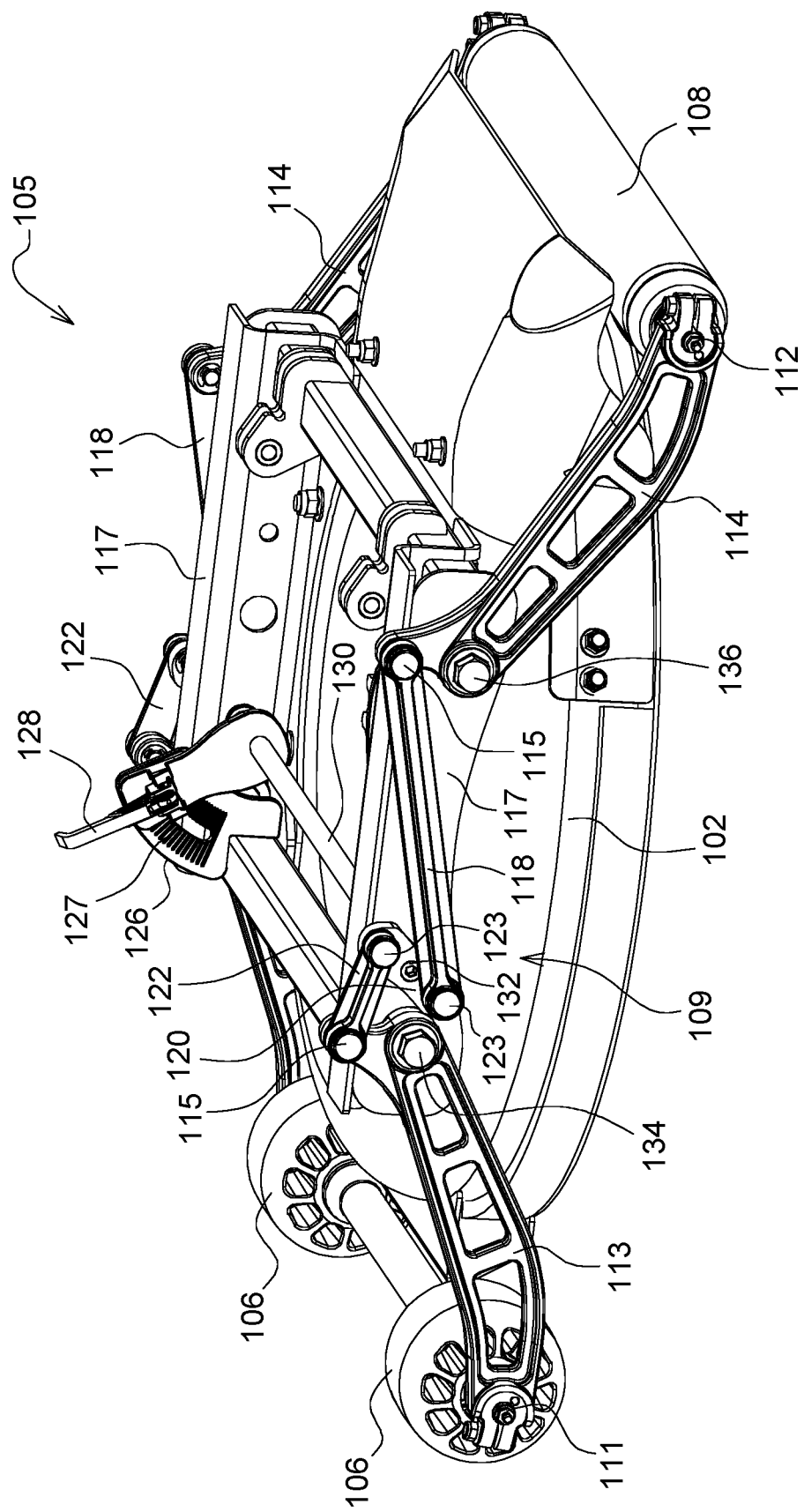
FIG. 3 is a perspective view of a height of cut adjustment system at a second height of cut according to a first embodiment of the invention.

As shown in FIGS. 2-3, in one embodiment, each rotary deck 100 includes a circular inverted dish-shaped cutting chamber 102. A hydrostatic or electric motor may be mounted onto the rotary cutting deck. The motor turns a cutting blade attached to a generally vertically aligned spindle under the deck.

In one embodiment, the rotary cutting deck may be supported over the ground surface by ground engaging members at the front and rear of the deck, such as front pair of rollers 106 and rear roller 108. The rollers, casters or wheels may be rotatably mounted to and supported by axle 111 at or near the front of the rotary cutting deck, or may be independently mounted to each front height of cut arm 113. One or more rear rollers 108 may be rotatably mounted to and supported by internal shaft or axle 112 at or adjacent the rear of the rotary cutting deck. Alternatively, the ground engaging members such as a roller, caster or wheel may be independently mounted to each rear height of cut arm 114.

In one embodiment, height of cut adjustment system 105 may include height of cut linkage 109 on the left side of the rotary cutting deck and height of cut linkage 110 on the right side of the rotary cutting deck. Each front height of cut arm 113 and rear height of cut arm 114 may have an upper end pivotably mounted to frame member 117 above the cutting deck. Each height of cut linkage 109, 110 may be connected between a front height of cut arm 113 and rear height of cut arm 114. Each height of cut linkage may include front link 122, center link 120 and back link 118. Front link may be pivotably connected to the upper end of front height cut arm 113 above the front height of cut arm's pivot point or mounting point 134 to frame member 117, and back link may be pivotably connected to the upper end of rear height of cut arm 114 above the rear height of cut arm's pivot point or mounting point 136 to frame member 117. For example, pins 115 may be inserted through the front link and front height of cut arm, and through the back link and back height of cut arm, retained with snap rings. Center link 120 may be pivotably connected between front link 122 and back link 118. Pins 123 also may be inserted through the ends of the center link and the front and back links, retained with snap rings.

In one embodiment, height of cut adjustment system 105 may include connecting rod 130 extending transversely across the mower deck between height of cut linkage 109 on the left side of the deck and height of cut linkage 110 on the right side of the deck. Connecting rod 130 may pivot on its axis to pivot both height of cut linkages simultaneously to the same height of cut position. Each end of connecting rod 130 may be connected to the center link of one of the height of cut linkages. The center link may pivot with the connecting rod. For example, hex bolt or screw 132 may be inserted through a hex shaped opening in center link 120 and into the hollow end of one of the connecting rods having a hex shaped cross section. Alternatively, each end of the connecting rod may engage a height of cut linkage by using a carriage bolt that engages an opening in center link 120 and may be threaded into the end of connecting rod 130.

Figure 4:
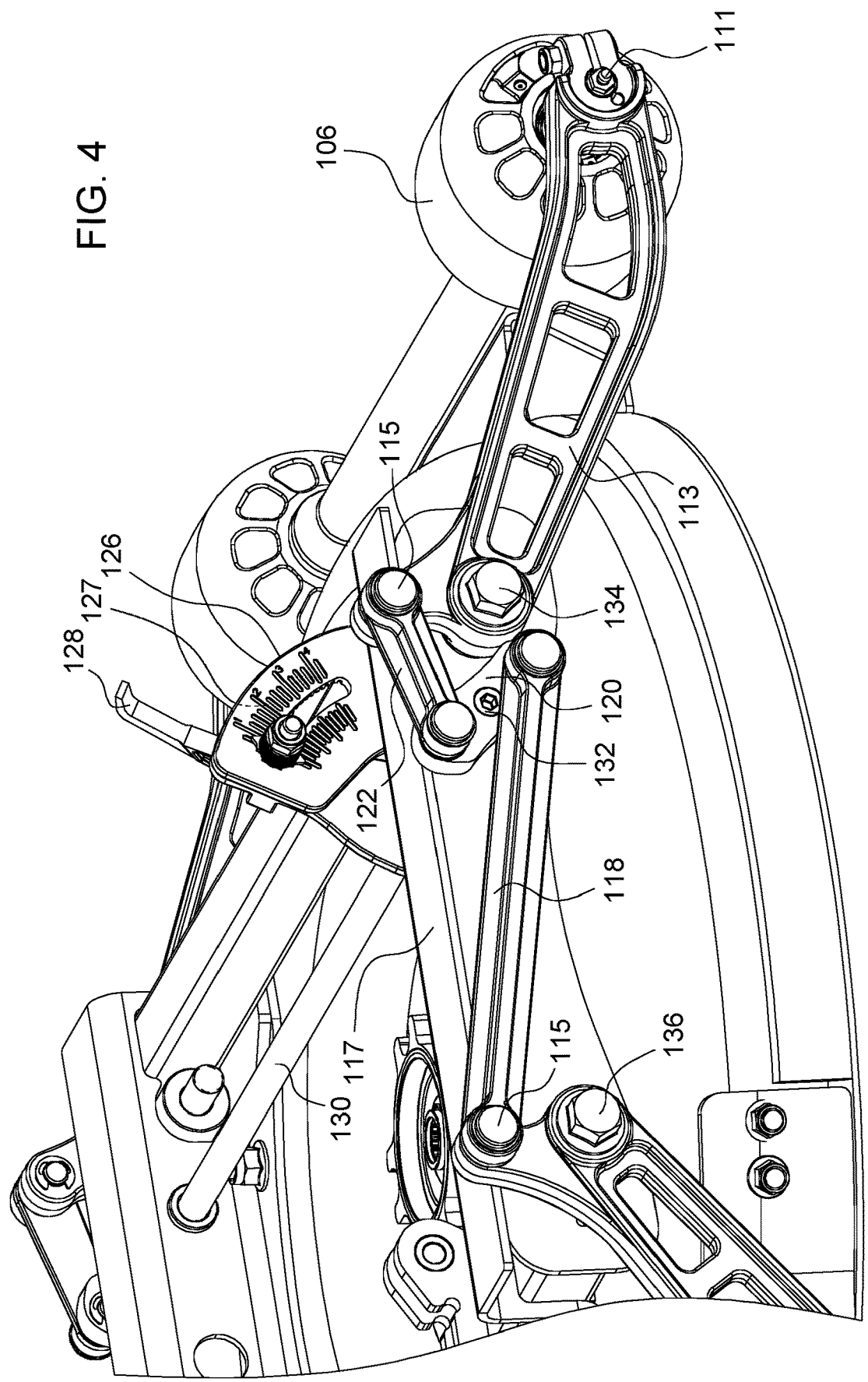
FIG. 4 is a perspective view of a height of cut adjustment system lever and pivot plate according to a first embodiment of the invention.

In one embodiment, as shown in FIG. 4, height of cut adjustment system 105 may include a height of cut adjustment lever 128 that may be used to move both height of cut linkages at the same time. The height of cut adjustment lever may be secured to connecting rod 130 by welding or mechanical attachment means. The height of cut adjustment lever may be pivoted from about 0 degrees to about 40 degrees for cutting heights of about 0.75 inches to about 4.5 inches. Additionally, the system may include pivot plate 126 welded to one of the frame members 117 above the surface of the deck, the pivot plate having notches or grooves 127. The height of cut adjustment lever may have teeth that line up with and engage the notches or grooves 127 at each height of cut position, as shown in FIGS. 2-4. Alternatively, other mechanical locking devices such as a gear or latch pin may be used instead of a notch lock to lock the system at a specified height of cut position.

Having described the preferred embodiment, it will become apparent that various modifications can be made without departing from the scope of the invention as defined in the accompanying claims.

The invention claimed is:

1. A height of cut adjustment system, comprising:
   a left height of cut linkage extending between a front height of cut arm and a rear height of cut arm pivotably mounted to a frame member on the left side of a rotary cutting deck;
   a right height of cut linkage extending between a front height of cut arm and a rear height of cut arm pivotably mounted to a frame member on the right side of a rotary cutting deck;
   a front pair of rollers rotatably mounted between the front height of cut arms, and a rear roller rotatably mounted between the rear height of cut arms;
   each height of cut linkage including a center link between a front link and a back link; the center link pivotable to shorten or extend the height of cut linkage; and
   a connecting rod extending between the center link of the left height of cut linkage and the center link of the right height of cut linkage.

2. The height of cut adjustment system of claim 1 wherein the connecting rod has first and second ends having a hex cross section that is engaged by a hex screw inserted through the center link of each height of cut linkage.

3. The height of cut adjustment system of claim 1 further comprising a height of cut adjustment lever attached to the connecting rod.

4. The height of cut adjustment system of claim 3 further comprising a pivot plate attached to one of the frame members.

5. A height of cut adjustment system, comprising:
   a pair of height of cut linkages extending fore and aft on a left side and a right side of a mower deck; each of the pair of height of cut linkages connecting a front height of cut arm to a rear height of cut arm; each of the pair of height of cut linkages is extendable to lower the height of cut and retractable to raise the height of cut;
   a connecting rod extending transversely across the mower deck between the pair of height of cut linkages; and
   a height of cut lever attached to the connecting rod for pivoting the connecting rod on its axis to simultaneously adjust the pair of height of cut linkages, the front height of cut arms and the rear height of cut arms.

6. The height of cut adjustment system of claim 5 wherein each height of cut linkage includes a center link pivotably connected between a front link and a back link.

7. The height of cut adjustment system of claim 6 wherein the center link pivots on the axis of the connecting rod.

8. The height of cut adjustment system of claim 5 wherein each height of cut linkage is connected to one of the pair of front height of cut arms and one of the pair of rear height of cut arms above a pivot point of each of the arms.

9. A height of cut adjustment system, comprising:
a plurality of mower decks on a rough, trim or surround mower;
a pair of height of cut linkages including a first height of cut linkage on a left side of the mower deck and a second height of cut linkage on a right side of the mower deck;
a connecting rod extending transversely across a top of each mower deck to connect the pair of height of cut linkages together whereby the pair of height of cut linkages are shortenable to raise the height of cut and lengthenable to lower the height of cut; and
a height of cut adjustment lever secured to the connecting rod.

10. The height of cut adjustment system of claim 9 wherein the connecting rod has hollow ends having a hex shaped cross section, each end is engaged by a hex bolt extending through a center link of each height of cut linkage.

11. The height of cut adjustment system of claim 10 wherein each of the center links pivots with the connecting rod to shorten or lengthen the height of cut linkages.

12. The height of cut adjustment system of claim 9 wherein the height of cut adjustment lever includes a plurality of teeth that engage notches in a pivot plate to lock the height of cut linkages at a selected height of cut.

\* \* \* \* \*